United States Patent
Nabicht et al.

(10) Patent No.: US 12,033,112 B2
(45) Date of Patent: Jul. 9, 2024

(54) METHOD AND SYSTEM FOR AN IMPROVED AGGREGATED LIQUIDITY POOL

(71) Applicant: Tradeweb Markets LLC, New York, NY (US)

(72) Inventors: Peter Francis Nabicht, Chicago, IL (US); Joseph Noviello, Summit, NJ (US)

(73) Assignee: Tradeweb Markets LLC, New York, NY (US)

( * ) Notice: Subject to any disclaimer, the term of this patent is extended or adjusted under 35 U.S.C. 154(b) by 0 days.

(21) Appl. No.: 17/152,060

(22) Filed: Jan. 19, 2021

(65) Prior Publication Data

US 2021/0224728 A1     Jul. 22, 2021

Related U.S. Application Data

(60) Provisional application No. 62/962,041, filed on Jan. 16, 2020.

(51) Int. Cl.
| | |
|---|---|
| *G06Q 40/00* | (2023.01) |
| *G06F 16/9035* | (2019.01) |
| *G06Q 10/087* | (2023.01) |
| *G06Q 30/0201* | (2023.01) |
| *G06Q 40/04* | (2012.01) |

(52) U.S. Cl.
CPC ........ *G06Q 10/087* (2013.01); *G06F 16/9035* (2019.01); *G06Q 30/0201* (2013.01); *G06Q 40/04* (2013.01)

(58) Field of Classification Search
CPC .. G06Q 10/087; G06Q 30/0201; G06Q 40/04; G06F 16/9035
See application file for complete search history.

(56) References Cited

U.S. PATENT DOCUMENTS

| | | | | |
|---|---|---|---|---|
| 7,308,428 | B1 * | 12/2007 | Federspiel | G06Q 40/06 705/37 |
| 7,496,533 | B1 * | 2/2009 | Keith | G06Q 40/04 705/37 |
| 9,734,533 | B1 * | 8/2017 | Givot | G06Q 30/08 |
| 2001/0042040 | A1 * | 11/2001 | Keith | G06Q 40/04 705/37 |
| 2007/0250433 | A1 * | 10/2007 | Bhat | G06Q 40/00 705/37 |
| 2009/0281954 | A1 | 11/2009 | Waelobroeck et al. | |
| 2013/0254087 | A1 * | 9/2013 | Rooz | G06Q 40/04 705/37 |
| 2017/0193602 | A1 | 7/2017 | Studnitzer et al. | |
| 2018/0197237 | A1 * | 7/2018 | Gleason | G06Q 40/00 |
| 2020/0279342 | A1 * | 9/2020 | Toffey | G06Q 40/04 |
| 2021/0049691 | A1 * | 2/2021 | Howorka | G06Q 40/04 |
| 2022/0027998 | A1 * | 1/2022 | Acuña-Rohter | G06Q 40/04 |

OTHER PUBLICATIONS

International Search Report and Written Opinion mailed on Apr. 7, 2021 in International Application No. PCT/2021/013909.

* cited by examiner

*Primary Examiner* — Rajesh Khattar

(74) *Attorney, Agent, or Firm* — McCarter & English, LLP; Jeffrey Mann

(57) ABSTRACT

Systems and methods are provided for managing orders and aggregating market data across a plurality of liquidity sources via an order router and market aggregator that is tightly integrated with a matching engine for substantially synchronous activity.

20 Claims, 5 Drawing Sheets

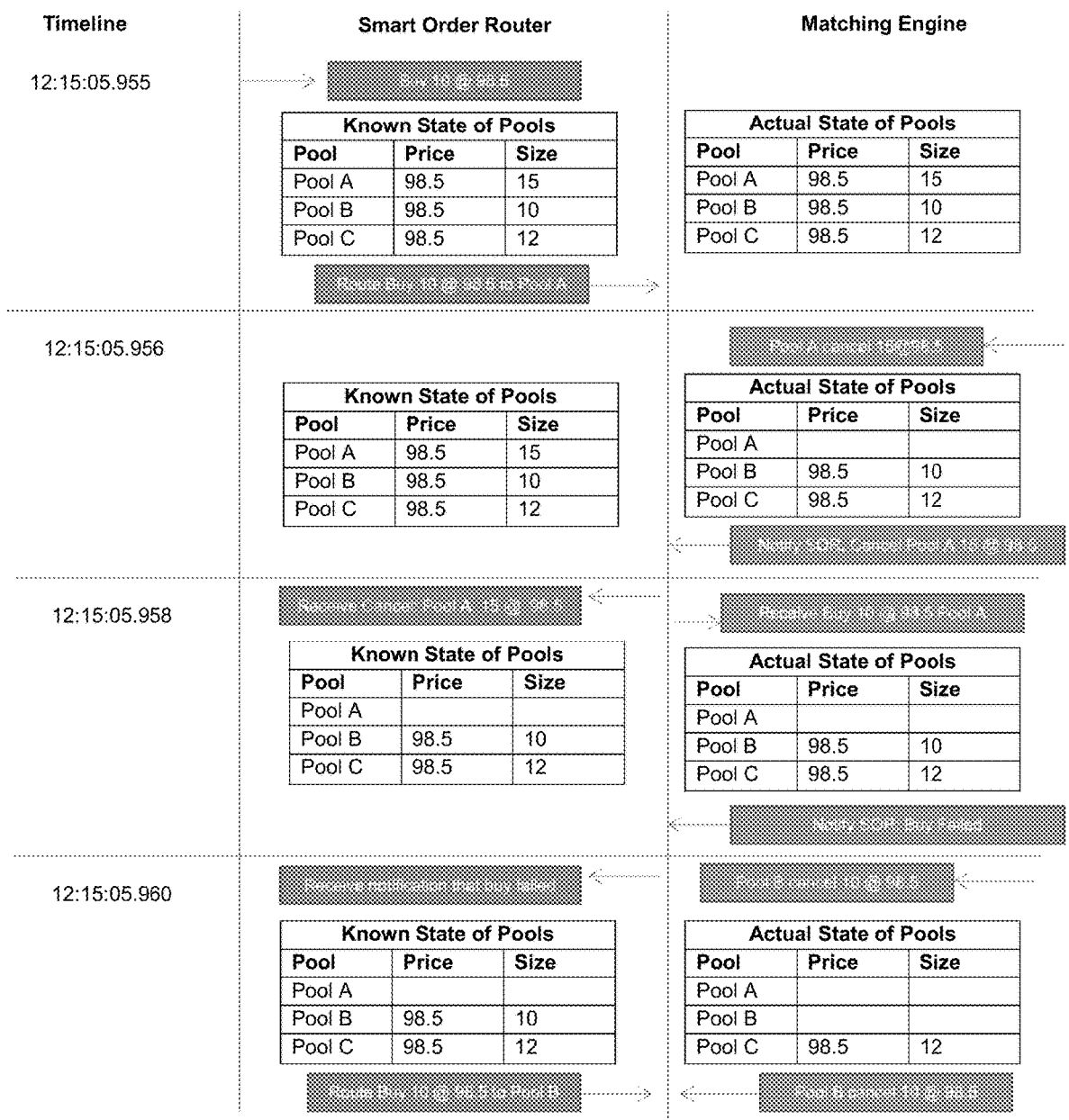

METHOD AND SYSTEM FOR AN IMPROVED AGGREGATED LIQUIDITY POOL

CROSS-REFERENCE TO RELATED APPLICATIONS

This application claims the benefit of U.S. Provisional Application No. 62/962,041 filed Jan. 16, 2020, which is incorporated by reference herein in its entirety.

BACKGROUND

Certain order routers and matching engines exist in the market. For example, there are Smart Order Routers and Order Book Matching Systems as described below.

Smart Order Routers are automated processes that handle orders and try to execute trades at the best available opportunity throughout a range of different liquidity sources. In the parlance of trading, the term Smart Order Router has become synonymous with Order Router. The descriptor "Smart" is typically applied no matter the level of intelligence or sophistication of logic in the order router.

An Order Book Matching System is a book-based electronic system that automatically matches buy and sell orders. The matching system tracks a book of open (i.e., resting) orders on both sides of the market. When a new order is submitted with a price that is equal to or better than the price of an order(s) resting on the opposite side of the order book, the system matches the newly arriving order with the resting order(s) it crosses.

SUMMARY

Various embodiments of the invention provide a method and system for an improved aggregated liquidity pool, comprising an order router/data aggregator that is tightly integrated with a matching engine to work across multiple, synchronized books of liquidity and increase the likelihood of a match.

In some embodiments, the invention provides a computerized system or a computer-implemented method for managing orders and aggregating market data across a plurality of liquidity sources, comprising receiving an order from a liquidity consumer to an aggregated liquidity pool comprising one or more basic pools; routing the order to the one or more basic pools based on a set of configurable decisions, wherein the decisions are configured to be executed as a single operation, and wherein cancelations and modifications are prevented in the basic pools while the routing is occurring; and matching the order with one or more resting orders in the basic pools based on a configurable logic.

In some embodiments, the basic pools include at least one multi-lateral pool comprising resting orders from other liquidity consumers.

In some embodiments, the basic pools include at least one remote pool comprising at least one remote liquidity source.

In some embodiments, the aggregated liquidity pool has a user interface substantially similar to those of the basic pools that it comprises.

In some embodiments, the order is a Fill and Kill, Fill or Kill, or Fill and Rest order.

In some embodiments, the logic is Price/Random-Pool, wherein the resting order with the best price is matched; and if more than one basic pool has a resting order at the best price then there is random selection between those pools. Each pool is equally weighted in the random selection.

In some embodiments, the logic is Price/Ranking/Random-Pool, wherein the resting order with the best price is matched; if more than one basic pool has a resting order at the best price then pool ranking is used and the basic pool ranked with the lowest integer is chosen; and if more than one basic pool having a resting order at the best price share the same ranking, then there is random selection between those pools. Each pool at the same ranking is equally weighted in the random selection.

In some embodiments, if more than one basic pool has a resting order at the best price then firm liquidity is selected over remote liquidity, and then pool ranking is used.

In some embodiments, the method further comprises generating the market data uniquely for each aggregated liquidity pool and providing the market data only to permissioned consumers of the aggregated liquidity pool.

In some embodiments, liquidity consumers and liquidity providers are anonymous.

In some embodiments, the invention provides a system for managing orders and aggregating market data across a plurality of liquidity sources, comprising a computer having stored thereon computer-executable instructions which, when executed, cause the computer to perform a method comprising: receiving an order from a liquidity consumer to an aggregated liquidity pool comprising one or more basic pools; routing the order to the one or more basic pools based on a set of configurable decisions, wherein the decisions are configured to be executed as a single operation, and wherein cancelations and modifications are prevented in the basic pools while the routing is occurring; and matching the order with one or more resting orders in the basic pools based on a configurable logic.

In some embodiments, the basic pools include at least one multi-lateral pool comprising resting orders from other liquidity consumers.

In some embodiments, the basic pools include at least one remote pool comprising at least one remote liquidity source.

In some embodiments, the aggregated liquidity pool has a user interface substantially similar to those of the basic pools that it comprises.

In some embodiments, the order is a Fill and Kill, Fill or Kill, or Fill and Rest order.

In some embodiments, the logic is Price/Random-Pool, wherein the resting order with the best price is matched; and if more than one basic pool has a resting order at the best price then there is random selection between those pools. Each pool is equally weighted in the random selection.

In some embodiments, the logic is Price/Ranking/Random-Pool, wherein the resting order with the best price is matched; if more than one basic pool has a resting order at the best price then pool ranking is used and the basic pool ranked with the lowest integer is chosen; and if more than one basic pool having a resting order at the best price share the same ranking, then there is random selection between those pools. Each pool at the same ranking is equally weighted in the random selection.

In some embodiments, if more than one basic pool has a resting order at the best price then firm liquidity is selected over remote liquidity, and then pool ranking is used.

In some embodiments, the method further comprises generating the market data uniquely for each aggregated liquidity pool and providing the market data only to permissioned consumers of the aggregated liquidity pool.

In some embodiments, liquidity consumers and liquidity providers are anonymous.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of certain embodiments, will be better understood when read in conjunction with the appended drawings, in which there are shown certain preferred embodiments. It should be understood, however, that the invention is not limited to the precise arrangements structures, features, embodiments, aspects, systems and instrumentalities shown and the arrangements, structures, features, embodiments, aspects, systems and instrumentalities shown may be used singularly or in combination with other arrangements, structures, features, embodiments, aspects systems and instrumentalities. The drawings are not in any way intended to limit the scope of this invention, but merely to clarify one or more embodiments of the invention. In the drawings.

DETAILED DESCRIPTION

Figure 1:
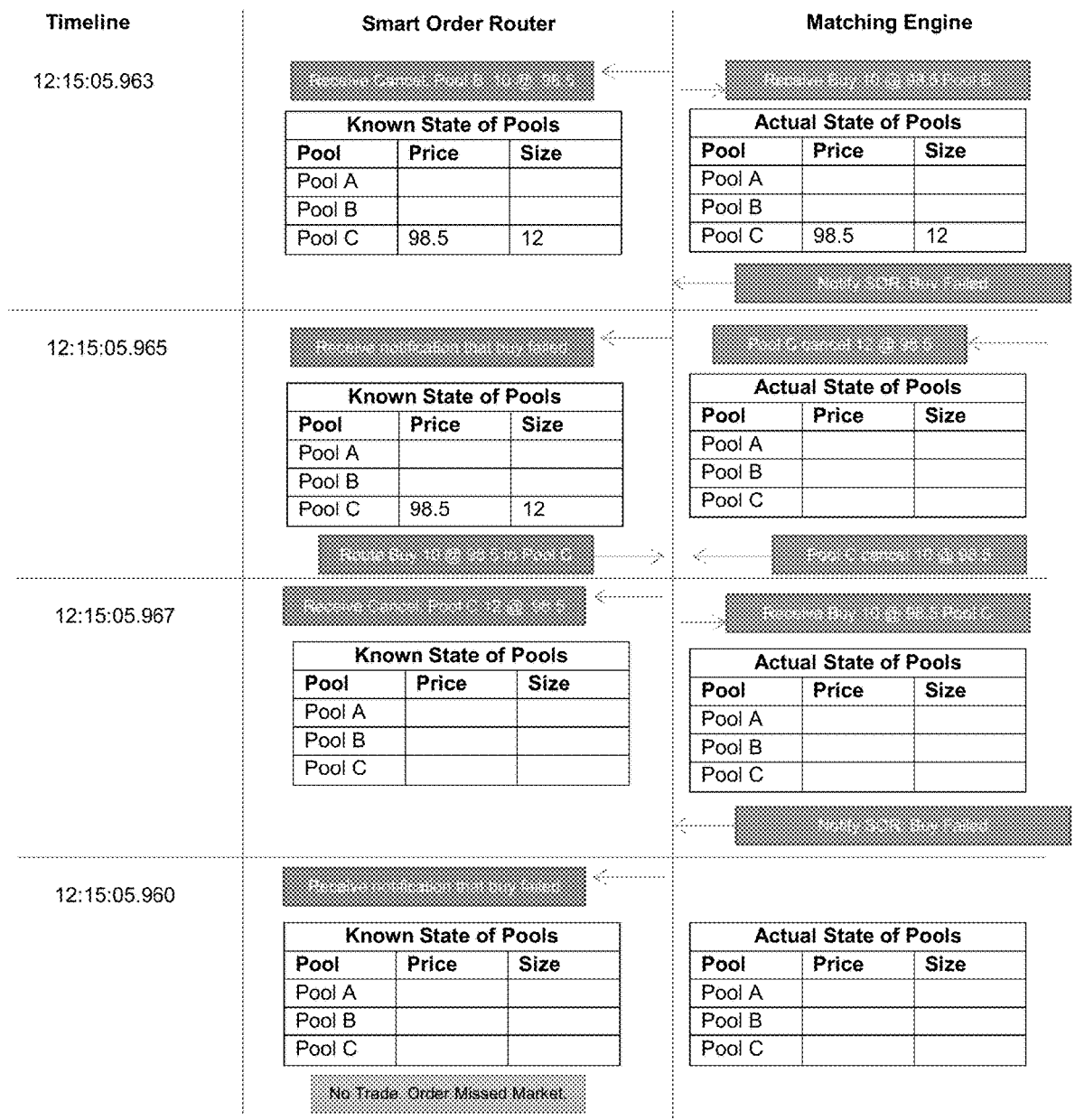
FIG. 1 shows an example of a Current State Race Condition.

A "Bi-lateral Pool" is a liquidity pool established for a single "Liquidity Provider" to make markets to multiple consumers. "Liquidity Consumers" can both aggress the Liquidity Provider and rest to the Liquidity Provider in these pools. Typically, Liquidity Consumers can only interact with the Liquidity Provider, only have knowledge of their own orders and those of the Liquidity Provider and cannot see orders from, or match with, other consumers.

A "Remote Pool" is a liquidity pool established for a single "Liquidity Provider" which contains markets received from an external Liquidity Provider system and made available to multiple consumers. Liquidity Consumers can both aggress the Liquidity Provider and rest to the Liquidity Provider in these pools consistent with the methods used for other pools; however, all requests from Liquidity Consumers against these markets all are subject to validation by the Liquidity Provider prior to execution. Unlike a Bi-lateral Pool, the markets maintained in a Remote Pool are retrieved using the interface specifications defined by the Liquidity Provider through a "Liquidity Gateway." The Liquidity Gateway serves as a bridge between the remote liquidity and the Remote Pools. The Liquidity Gateway retrieves remote liquidity, translates and presents it to the Remote Pool consistent with the requirements of the Remote Pools and facilitates validating of all trade requests with the remote liquidity source.

A "Multi-lateral Pool" is a liquidity pool established for resting orders from Liquidity Consumers who are not Liquidity Providers. This enables a resting order from one Liquidity Consumer to match with an aggressing order from another Liquidity Consumer.

A "Basic Pool" is an end point liquidity pool; Basic Pools do not provide order routing or data aggregation. Basic Pools are the underlying/component pools of the order routers/data aggregators. Remote Pools, Multi-lateral Pools, and Bi-lateral Pools are basic pools. Basic Pools used in the present invention may comprise firm liquidity or remote liquidity.

A "Synthetic Pool" is an order router/data aggregator. Unlike a Basic Pool, a Synthetic Pool does not maintain its own order book; it is an aggregation of one or more Basic Pools and routes orders to the Basic Pools it aggregates based on a predetermined set of configurable decisions. Although different in its routing behavior, a Synthetic Pool is preferably presented to consumers and providers via an interface consistent with that of a Basic Pool and programmatic interaction with a Synthetic Pool requires no specific application programming interface (API) distinction.

Synthetic Pools are typically created on a per-Liquidity Consumer basis. Liquidity Providers do not interact directly with Synthetic Pools; rather, they interact with a Basic Pool that can be one of the Synthetic Pool's components.

Various embodiments of the present invention provide an improved aggregated liquidity pool (Synthetic Pool) referred to herein as "Cascade," whereby a Liquidity Consumer's order can cascade through the various Basic Pools of liquidity in the aggregation based on order routing definitions. Cascade comprises an order router and market data aggregator that works across multiple, synchronized books of liquidity. In preferred embodiments, it is tightly coupled with a matching engine to allow the order router to have access to the most current state of the order books at the time of match and to prevent the order books from being modified while Cascade is accessing them.

Certain order routers and matching engines exist in the market. For example, there are Smart Order Routers and Order Book Matching Systems as described below.

Smart Order Routers are automated processes that handle orders and try to execute trades at the best available opportunity throughout a range of different liquidity sources. In the parlance of trading, the term Smart Order Router has become synonymous with Order Router. The descriptor "Smart" is typically applied no matter the level of intelligence or sophistication of logic in the order router.

An Order Book Matching System is a book-based electronic system that automatically matches buy and sell orders. The matching system tracks a book of open (i.e., resting) orders on both sides of the market. When a new order is submitted with a price that is equal to or better than the price of an order(s) resting on the opposite side of the order book, the system matches the newly arriving order with the resting order(s) it crosses.

Order routers interact with matching engines, but they do so loosely. Order routers and matching engines perform their tasks independently and asynchronously. This can lead to race conditions where the order router knows a different state of the matching engine's order books than actually exist. In these cases, the order router can miss some or all of the liquidity. See the example in FIG. 1 where due to only a slight delay in time, the order router is unable to process the trade.

Cascade advances the relationship between Smart Order Routers and Order Book Matching Systems by tightly coupling the two and ensuring synchronous activity, for example, via a new algorithm that eliminates inconsistencies between the Order Router and Order Book Matching System and enhances synchronization. The algorithm is implemented on a specialized computer-based system, operative with specific programming for providing the functionality, as described herein.

Matching engines tend to execute requests (new order, modify, cancel, etc.) one at a time. For example, while processing one new order request, it cannot process another cancel. The matching engine does this by blocking all other activity while a given request is being processed.

Figure 2:
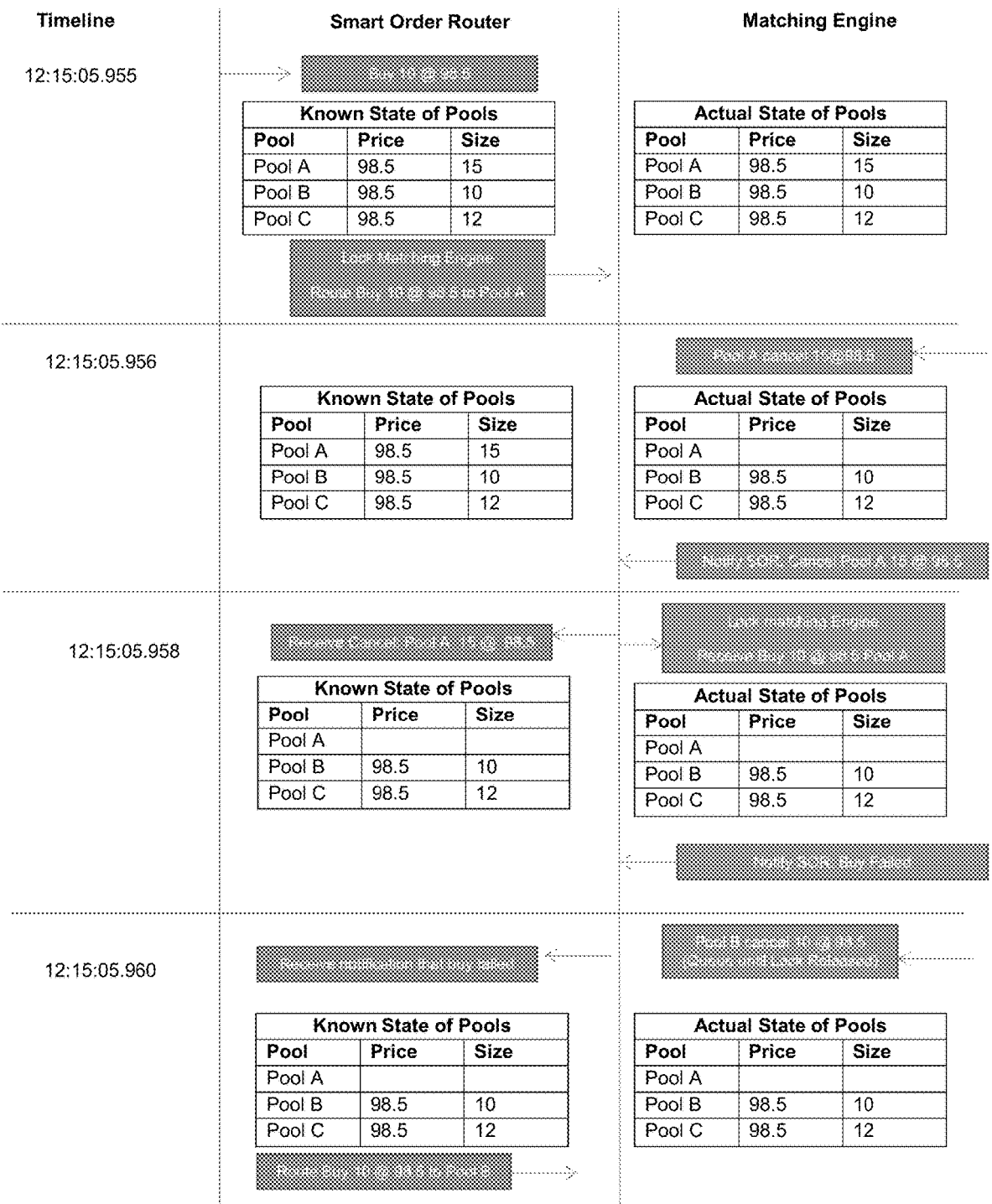
FIG. 2 shows an example of a Removed Race Condition with Lock according to some embodiments of the invention.
Figure 2:
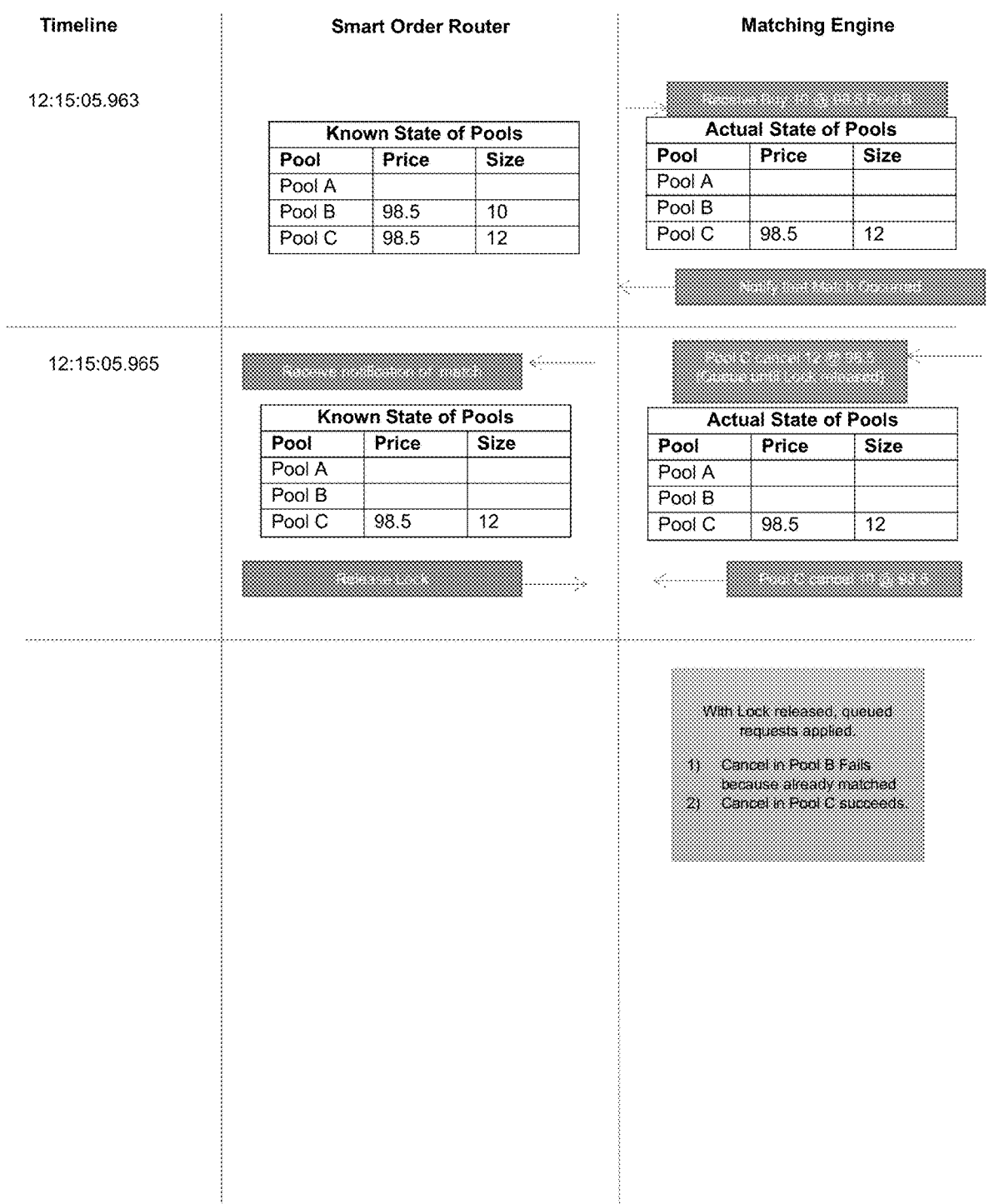

Cascade elevates the blocking to the level of the order router. Instead of treating each individual decision of the order router as a command to execute, the matching engine treats the entire order routing decision tree as a collection of commands to execute as a single operation. This removes the ability for a series of race conditions to occur during the order routing process and increases the likelihood of a match. See FIG. 2 where because of a lock the liquidity is not missed and the trade can be executed. Note: FIG. 2 does not indicate structural design or networked interactions; it simply shows the logical flow of information and actions between two components.

In some embodiments, Cascade has the same interface and characteristics as the books of liquidity that it is aggregating. This allows for seamless transition between single pool interaction and using an aggregation of multiple pools. Customers and independent software vendors (ISVs) do not need to do any additional work to get a customized view and interaction with liquidity. Fill and Kill, Fill or Kill, and Fill and Rest orders are supported.

As noted above, the order router/data aggregator disclosed herein is tightly integrated with the matching engine. Tight integration with the matching engine removes race conditions between actions in the Cascade Pool and actions in the Basic Pools included in the Cascade Pool. In various illustrative embodiments, modifications cannot be made in the underlying Basic Pools while a Cascade Pool action is under way. At the time of routing an order, the Cascade Pool has a complete and accurate view of the state of each constituent Basic Pool. No cancellations or modifications can take place in the underlying Basic Pools while the order routing is occurring, removing the ability for Cascade to "miss" on liquidity. In some embodiments, as described further below, a Liquidity Consumer's order sent to Cascade that does not match may rest (stay in the order book) for each of the underlying Basic Pools of the cascade ("Multirest"). However, the system ensures that this order may only be filled by a single Liquidity Provider in one of the Basic Pools and cannot be matched simultaneously in multiple Basic Pools. All modifications in Basic Pools resulting from a fill in another Basic Pool are processed before new matches can take place. This prevents the "over fill" scenarios.

Each order router has configurable logic that determines what resting orders get matched with. In some embodiments of the invention, the logic is "Price/Random-Pool." The best price available always gets matched. If more than one Basic Pool has an order at the best price then there is random selection of from all constituent Basic Pools at that price. All Basic Pools are equally weighted in random selection. Number of orders or amount of liquidity shown does not impact the selection algorithm. The Basic Pool that is chosen is matched with across all accessible resting orders at the best price until either the resting orders' size is exhausted or the size of the inbound order is exhausted. If there is size remaining on the inbound order, the logic repeats until all resting size at the inbound order's given price (or better) is exhausted or the inbound aggressing order's size is exhausted. If all resting orders at inbound Fill and Rest order's price (or better) is exhausted, the size of the inbound order is not exhausted then remaining size is rested fully in all constituent Basic Pools.

In other embodiments, the logic of the order router is "Price/Ranking/Random-Pool." The best price available always gets matched. If more than one constituent Basic Pool has available resting orders at the best price then the pool ranking is used. The Basic Pool ranked with the lowest integer is chosen. If more than one constituent Basic Pool has resting orders at the best price and share the same ranking, then there is a random selection of all pools at that price. All pools at the same ranking are equally weighted in random selection. The number of orders or amount of liquidity shown does not impact the selection algorithm. The Basic Pool that is chosen is matched across all available resting orders at the best price until either the resting orders' size is exhausted or the size of the inbound order is exhausted. If there is size remaining on the inbound order, the logic repeats. It repeats until all resting size at the inbound order's given price (or better) is exhausted or the inbound aggressing order's size is exhausted. If all resting orders at the inbound order's price (or better) are exhausted, the size of the inbound order is not exhausted, and the inbound order is a Fill and Rest (FAR), resulting in its remaining size being rested to all constituent Basic Pools.

In some embodiments, the logic of the order router is configured with a preference for firm liquidity. The best price available always gets matched as the first criteria; if more than one constituent pool has available resting orders at the best price then liquidity from Basic Pools comprising only firm liquidity is used prior to any liquidity from Remote Pools. In some embodiments, the order router may combine this logic with "Price/Ranking/Random-Pool," for example such that firm liquidity is selected over remote liquidity before pool ranking is used. In one embodiment there is no need for any user interaction once the specialized computer system is pre-configured with the preferences for firm liquidity.

In some embodiments, Fill and Rest orders that are not fully matched upon placement are fully rested to all constituent Basic Pools. This means the entire size is shown to and actionable in each constituent Basic Pool, as the Basic Pool allows. Upon being matched in one Basic Pool, the corresponding amount to the fill is removed from all other constituent Basic Pools. For example, if an order for 20 is resting and gets filled for 10, then 10 is removed from all other constituent Basic Pools. The removal is done in one embodiment via a modify message for partial fills and a cancel message for full fills. This ensures that Customers not directly involved in the transaction know that the reason it was removed was a fill, limiting information leakage. The fact that the entire market, across all pools, is locked at the time of fill (meaning no other activity can occur), means that the resting orders are appropriately modified before the next possible fill is processed. This can prevent the same resting quantity from being matched multiple times (overfill prevention). This will reduce the amount of lost liquidity and increase the number of trades that may have otherwise missed the market.

Figure 3:
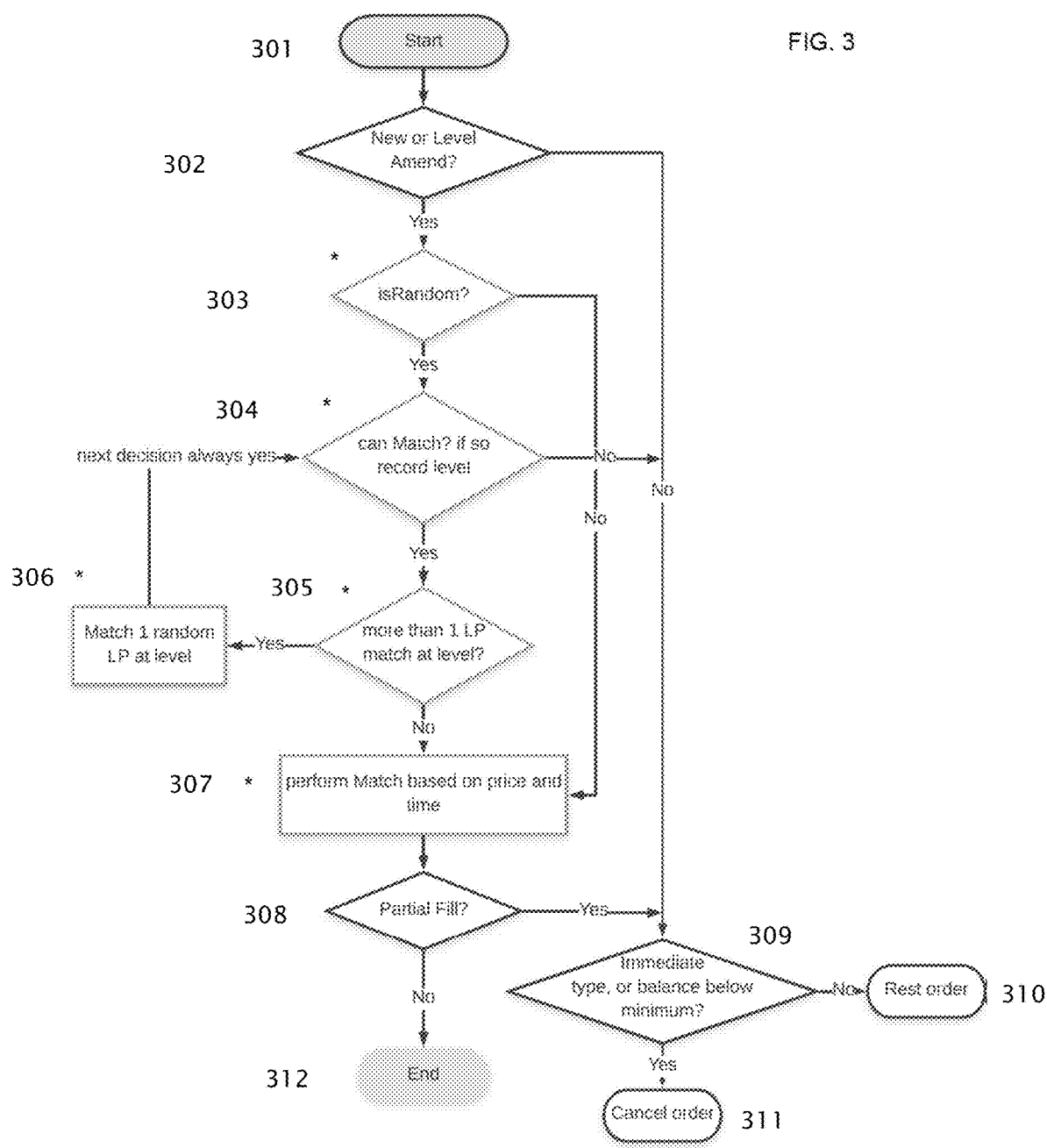
FIG. 3 shows an example of a process for matching and potential fulfilment according to some embodiments of the invention, where blocks marked with an asterisk contain logic specific to Cascade Pools.

FIG. 3 shows an example of a process for matching and potential fulfilment according to some embodiments of the invention, where blocks marked with an asterisk contain logic specific to Cascade Pools. The illustrative process starts at 301. At 301 the process determines whether the order is New or Level Amend. If No at 301, the process determines at 309 whether the order is Immediate type, or balance below minimum. If No, the order is rested at 310. If Yes, the order is canceled at 311. If Yes at 301, the process determines at 303 whether selection is Random. If No at 303, the process at 307 performs a Match based on price and time. At 308 the process determines whether the fill is a Partial Fill. If Yes at 308, the process continues at 309. If No at 308, the process is ended at 312. If Yes at 303, the process determines at 304 whether the order can be Matched, and if so, records the level. If No at 304, the process continues at 307. If Yes at 304, the process determines at 305 whether there is more than one Liquidity Pool (LP) match at that level. If No at 305, the process continues at 307. If Yes at 305, the process at 306 matches one random Liquidity Pool at that level and continues with a Yes at 304.

Market data is an aggregation of all activity of the underlying Basic Pools. For Bi-lateral pools, this is the activity of the pool's Operator (Liquidity Provider). For Multi-lateral pools, this is the activity of all Liquidity Consumers permissioned for each Multi-lateral Pool. Because of this, in some embodiments, the market data is generated uniquely for each Cascade Pool and only distributed to the permissioned consumers of the Cascade Pool. The market data only reflects fills that they are involved with. The consumer the Cascade Pool is set up for can optionally choose to see their own orders reflected in the market data. The market data is an aggregation of all order activity in the component pools. This means market data can be reflected at both price level and order level. Because the matching logic reflects an element of randomness, the market data is not indicative of the matching priority or ordering of the resting orders that share a price.

In some embodiments, when matches occur, the only market Customers who know of the fill are the two firms involved in the match. The match data is sent in their trading sessions. The match data is sent in their post trade sessions. The match is reflected in their market data. No other Customer is notified of the fill, thus limiting information leakage on fills. Even in the market data there is no notification. The change in the market is reflected as a modify instead of a trade.

In some embodiments, the identity of the Liquidity Provider and Liquidity Consumer are known to one another; while other embodiments may provide execution amongst Liquidity Providers and Liquidity Consumers anonymously.

In an exemplary embodiment, the system architecture of the computerized system and method includes hardware, system software and application software. The system hardware may include one or more mainframe computers each having at least one processor and memory. The system hardware may additionally include other components such as storage and network components (i.e., servers, routers, switches, data buses, databases, etc.), networked to the mainframe computer and any external connections as would be understood by a person of ordinary skill in the art having the benefits of the present disclosure. In an exemplary embodiment, a computerized electronic trading system and method includes a plurality of user computers through which the Customers (consumers and providers) can process their trades. The system preferably includes one or more computer systems that can include one or more software modules, databases and related database management systems. Customer computers can also typically connect to or include an order management system ("OMS") or execution management system ("EMS") to assist in the submission and execution and trading of securities. Various input and output devices are preferably provided with the consumer computers and provider computers including, by way of non-limiting example, a display (e.g., liquid crystal display (LCD)), and an input device (e.g., a keyboard, mouse, touch pad, or light pen). Preferably, an Application Programming Interface ("API") or other specialized computer hardware or software that is used to connect the providers and consumers to the electronic trading system and perform certain tasks automatically. For example, an API may be utilized by Liquidity Consumers to connect their system with the electronic trading system for the purpose of sending orders which can eventually be matched with opposing liquidity. Liquidity Providers may connect via an API for the purpose of providing the trading system with price information, for example by having an automated provider trading system communicatively coupled to the trading system. The consumer and provider computers would also preferably include a storage device such as, for example, a magnetic disk drive and magnetic disk or other equivalent device. The specific hardware combination/configuration is not crucial to the instant invention, and may vary as a matter of design choice within the functional parameters disclosed herein. Customers of the trading system typically interact with the Graphical User Interfaces ("GUI's") displayed by the software modules by "clicking" on numbers or graphics (e.g., buttons) that are displayed on the GUI's. Persons of skill in the art will understand that the present invention is not limited to clicking with a computer mouse or any of the above listed hardware or software modules, but includes use of any other device for indicating an action with graphics-based software and other hardware and software arrangements.

It should be noted that the embodiments described may use multiple software modules for performing the various functions of the system, while other embodiments could be implemented using any number of modules, with any single module incorporating the functions of several, or all, of the modules. The precise design of the software and the programming language used may be designed differently within the scope of the present invention. The software modules can be created using art recognized programming languages, including but not limited to Python, C++, ASP, Java, C #, ASP.NET, or PHP or any combination of known or later developed programming languages that allow the functionality described.

The software functions of the computerized electronic trading system and method described herein may be programmed via application software, system software or any combination thereof, and may be executable on one or more hardware components within the system, external to the system or some combination thereof. In some embodiments, system and/or application level software may reside on system hardware, various external customer computer systems, or some combination thereof.

Similarly, the implementation of various software functions described herein may at times overlap. In various embodiments, some software components may be stored in hardware residing within the system, external to the system or some combination thereof. For example, in some embodiments a software implementation may consist of a stand-alone application installed on a mainframe computer. In other embodiments, certain aspects may reside on customer hardware programmed to communicate with the trading system and method. Accordingly, the present invention s be understood to include those variations as would be understood by a person of ordinary skill in the art having the benefits of the present disclosure.

It will also be understood that, the various embodiments of the present invention can be realized through a web-based centralized server architecture, a thin client, fat client, or peer-to-peer type arrangement which could be substituted for other system architecture and are within the scope of the present invention. Additionally, the programming described herein can be stored in a machine readable form on a computer readable medium, such as a CD-ROM, DVD or other storage medium, and distributed to users for installation on user computers. Alternatively, such programming can be downloaded via network. In either embodiment, communication with the system may be effected across known networks, such as the Internet.

It should be noted that references herein to phrases such as "one embodiment" or "an embodiment" mean that a particular feature, structure or characteristic described in connection with the embodiment is included in at least one embodiment of the invention. The phrases such as "in one embodiment" or "in certain embodiments" in various places in the specification are not necessarily, but can be, referring to the same embodiment. Use of the term "preferred" or "preferably" is intended to indicate a configuration, set-up, feature, process, or alternative that may be perceived by the inventor(s) hereof, as of the filing date, to constitute the best, or at least a better, alternative to other such configurations, set-ups, features, processes, or alternatives. In no way shall the use of the term "preferred" or "preferably" be deemed to limit the scope of the claims hereof to any particular configuration, set-up, feature, process, or alternative.

It will be further appreciated by those skilled in the art that the appended figures are purely illustrative, and that the system may be implemented in any number of ways, by the actual designers, as long as the functionality as described above, stays intact.

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention or the broad inventive concept thereof. Moreover, numerous modifications and changes may readily occur to those skilled in the art. Hence, it is not desired to limit the invention to the exact construction and operation shown and described and, accordingly, all suitable modification equivalents may be resorted to falling within the scope of the invention as claimed.

What is claimed is:

1. A computer-implemented method for managing orders and aggregating market data across a plurality of liquidity sources, comprising:
   receiving an order from a liquidity consumer to an aggregated liquidity pool comprising one or more basic pools;
   routing the order to the one or more basic pools based on a set of configurable decisions, wherein the decisions are configured to be executed as a single operation, and wherein cancelations and modifications are prevented in the basic pools while the routing is occurring;
   matching the order with one or more resting orders in the basic pools based on a configurable logic resulting in the creation of match data, wherein in case of less than a full match, upon placement of the order, fully resting the order, and in case of a full match, upon placement of the order, removing a corresponding amount to the placed order amount from all other constituent basic pools; and
   sending the match data to market customers whose order has been matched to limit information leakage related to previously executed orders; wherein a matching engine is tightly integrated with an order router such that the matching engine activates the order router so as to ensure synchronous activity between the order router and the matching engine and controls the order router to provide the order router access to the most current state of the matched order at the time of a match and prevents modification of the matched order during said access so as to remove race conditions between actions in the aggregated liquidity pool and the one or more basic pools that are included in the aggregated liquidity pool.

2. The method of claim 1, wherein the basic pools include at least one multi-lateral pool comprising resting orders from other liquidity consumers.

3. The method of claim 1, wherein the basic pools include at least one remote pool comprising at least one remote liquidity source.

4. The method of claim 1, wherein the aggregated liquidity pool has a user interface substantially similar to those of the basic pools that it comprises.

5. The method of claim 1, wherein the order is a Fill and Kill, Fill or Kill, or Fill and Rest order.

6. The method of claim 1, wherein the logic is Price/Random-Pool, wherein the resting order with the best price is matched; and if more than one basic pool has a resting order at the best price then there is random selection between those pools, each pool being equally weighted in the random selection.

7. The method of claim 1, wherein the logic is Price/Ranking/Random-Pool, wherein the resting order with the best price is matched; if more than one basic pool has a resting order at the best price then pool ranking is used and the basic pool ranked with the lowest integer is chosen; and if more than one basic pool having a resting order at the best price share the same ranking, then there is random selection between those pools, each pool at the same ranking being equally weighted in the random selection.

8. The method of claim 7, wherein if more than one basic pool has a resting order at the best price then firm liquidity is selected over remote liquidity, and then pool ranking is used.

9. The method of claim 1, further comprising generating the market data uniquely for each aggregated liquidity pool and providing the market data only to permissioned consumers of the aggregated liquidity pool.

10. The method of claim 1, wherein liquidity consumers and liquidity providers are anonymous.

11. A system for managing orders and aggregating market data across a plurality of liquidity sources, comprising:
   a computer comprising a matching engine and an order router, wherein the computer has stored thereon computer-executable instructions which, when executed, cause the computer to perform a method comprising:
      receiving an order from a liquidity consumer to an aggregated liquidity pool comprising one or more basic pools;
      routing the order to the one or more basic pools based on a set of configurable decisions, wherein the decisions are configured to be executed as a single operation, and wherein cancelations and modifications are prevented in the basic pools while the routing is occurring;
      matching the order with one or more resting orders in the basic pools based on a configurable logic resulting in the creation of match data, wherein in case of less than a full match, upon placement of the order, fully resting the order, and in case of a full match, upon placement of the order, removing a corresponding amount to the placed order amount from all other constituent basic pools; and sending the match data to market customers whose order is matched to limit information leakage related to filled orders;

wherein the matching engine and the order router are tightly integrated such that the matching engine activates the order router so as to ensure synchronous activity between the order router and matching engine; and wherein the matching engine treats an entire decision tree of the order router as a collection of commands to enable execution of the entire decision tree as a single operation; and the matching engine controls the order router to provide the order router access to the most current state of the order at the time of a match and prevents modification of the matched order during said access so as to remove race conditions between actions in an aggregated liquidity pool and the one or more basic pools that are included in the aggregated liquidity pool.

12. The system of claim 11, wherein the basic pools include at least one multi-lateral pool comprising resting orders from other liquidity consumers.

13. The system of claim 11, wherein the basic pools include at least one remote pool comprising at least one remote liquidity source.

14. The system of claim 11, wherein the aggregated liquidity pool has a user interface substantially similar to those of the basic pools that it comprises.

15. The system of claim 11, wherein the order is a Fill and Kill, Fill or Kill, or Fill and Rest order.

16. The system of claim 11, wherein the logic is Price/Random-Pool, wherein the resting order with the best price is matched; and if more than one basic pool has a resting order at the best price then there is random selection between those pools, each pool being equally weighted in the random selection.

17. The system of claim 11, wherein the logic is Price/Ranking/Random-Pool, wherein the resting order with the best price is matched; if more than one basic pool has a resting order at the best price then pool ranking is used and the basic pool ranked with the lowest integer is chosen; and if more than one basic pool having a resting order at the best price share the same ranking, then there is random selection between those pools, each pool at the same ranking being equally weighted in the random selection.

18. The system of claim 17, wherein if more than one basic pool has a resting order at the best price then firm liquidity is selected over remote liquidity, and then pool ranking is used.

19. The system of claim 11, further comprising generating the market data uniquely for each aggregated liquidity pool and providing the market data only to permissioned consumers of the aggregated liquidity pool.

20. The system of claim 11, wherein liquidity consumers and liquidity providers are anonymous.

* * * * *